United States Patent [19]

Yoshioka

[11] Patent Number: 4,706,247
[45] Date of Patent: Nov. 10, 1987

[54] DATA TRANSMISSION APPARATUS

[75] Inventor: Kazuo Yoshioka, Nagasaki, Japan

[73] Assignee: Mitsubishi Denki Kabushiki Kaisha, Tokyo, Japan

[21] Appl. No.: 808,730

[22] Filed: Dec. 13, 1985

[30] Foreign Application Priority Data

Dec. 14, 1984 [JP] Japan ................. 59-262854

[51] Int. Cl.⁴ ............................ H04J 3/02; H04J 3/00
[52] U.S. Cl. ........................................ 370/85; 370/99
[58] Field of Search ...................... 370/85, 86, 89, 95, 370/99, 110.1; 340/825.5

[56] References Cited

U.S. PATENT DOCUMENTS 4,373,183  2/1983  Means et al. .................. 340/825.5
4,488,218 12/1984  Grimes ........................... 340/825.5
4,494,113  1/1985  Yamaoka et al. .............. 340/825.5

FOREIGN PATENT DOCUMENTS 0154946 12/1979  Japan ............................ 370/85
57-46099 10/1982  Japan .
2142507  1/1985  United Kingdom .......... 370/85

Primary Examiner—Douglas W. Olms
Assistant Examiner—Curtis Kuntz
Attorney, Agent, or Firm—Bernard, Rothwell & Brown

[57] ABSTRACT

A data transmission apparatus is disclosed which is of the type in which data generated therein by two data generating blocks are transmitted through a bus common to these blocks. One data generating block generates a data validating signal which indicates that the data to be transmitted thereby is valid and delivers the data to a bus, while the other data generating block is inhibited from outputting its data when the data validating signal exists.

4 Claims, 3 Drawing Figures

DATA TRANSMISSION APPARATUS

BACKGROUND OF THE INVENTION

1. Field of the Invention

The present invention relates to a data transmission apparatus for transmitting data from a plurality of data generating blocks to a common bus, which is applicable, for example, to a picture signal processing apparatus having, as its data generating blocks, video-signal data generating means and character data generating means.

2. Description of the Prior Art

So far, in a data transmission apparatus structured such that a plurality of data generating blocks therein are adapted to be able to independently transmit data to a data bus, there has been provided, in general, a bus control block for deciding which data generating block is granted permission to use the bus when two or more of the data generating blocks have simultaneously requested permission to transmit their data.

A prior art bus control system as described above is disclosed in the Japanese Patent Application Publication No. 46099/82. The disclosed bus control system is, as shown in FIG. 3, a multiprocessor system including a plurality of microprocessors processing data through accessing a bused common memory area, in which system the plurality of microprocessors are divided into m groups of minor multiprocessor systems, these divided groups are connected with each other through a bus controller, each divided group is provided with at least one bused common memory area, and the plurality of microprocessors belonging to the group are enabled to access the bused common memory area independently of each other. Further describing the system with reference to FIG. 3, reference numerals 31A to 31D denote the minor multiprocessor systems, 32 denotes a bus controller, and 33 denotes a control processor for the entire system. In the described bus system, when all the minor multiprocessor systems 31A, 31C, and 31D wish to access the minor multiprocessor system 31B, the bus controller 32 is adapted, for example, to decide the order of priority and permit a specific minor multiprocessor system to access the minor multiprocessor system 31B.

In the prior art data transmission apparatus as described above, the switching to a specific data generating block for allowing the same to output data to the bus was only possible when there was provided a pattern generated within the bus control block or a pattern that could be identified by the bus control block. Therefore, it was impossible for the apparatus to make the above switching in response to the pattern whatever the data output from a specific data generating block would take and without the process of identification of the pattern by the bus control block. In the case, for example, where one of the data generating blocks was a video-signal data generating block and the other was a character-data generating block, there was such a problem that it was impossible for the prior art apparatus to cause the video-signal data and the character data output from both the blocks to be transmitted through a common bus.

SUMMARY OF THE INVENTION

The present invention is directed to the provision of an approach to solve the aforementioned problem encountered in the prior art data transmission apparatus.

According to one embodiment of the invention, the data transmission apparatus comprises bus means including a data bus, a bus-clock bus, and a bus for a data validating signal; first and second data generating blocks connected to the bus means; and a bus control block for supplying the first and second data generating blocks with a bus clock. The first data generating block generates a data validating signal which indicates that the data it transmits is valid and has a function to output the signal to the data-validating signal bus. The second data generating block is inhibited from transmitting its data while the data validating signal is received from the data-validating signal bus. Thus, it is effected that the data of the first data generating block, or that of the second data generating block, can only be transmitted through the data bus, and selection of the data out of these two kinds of data is achieved according to existence or nonexistence of the data validating signal. The bus control for transmitting different kinds of data through a common bus has thus been made attainable with the use of a structure which is much simpler and hence economical as compared with the prior art apparatus.

DETAILED DESCRIPTION OF THE PREFERRED EMBODIMENT

Figure 1:
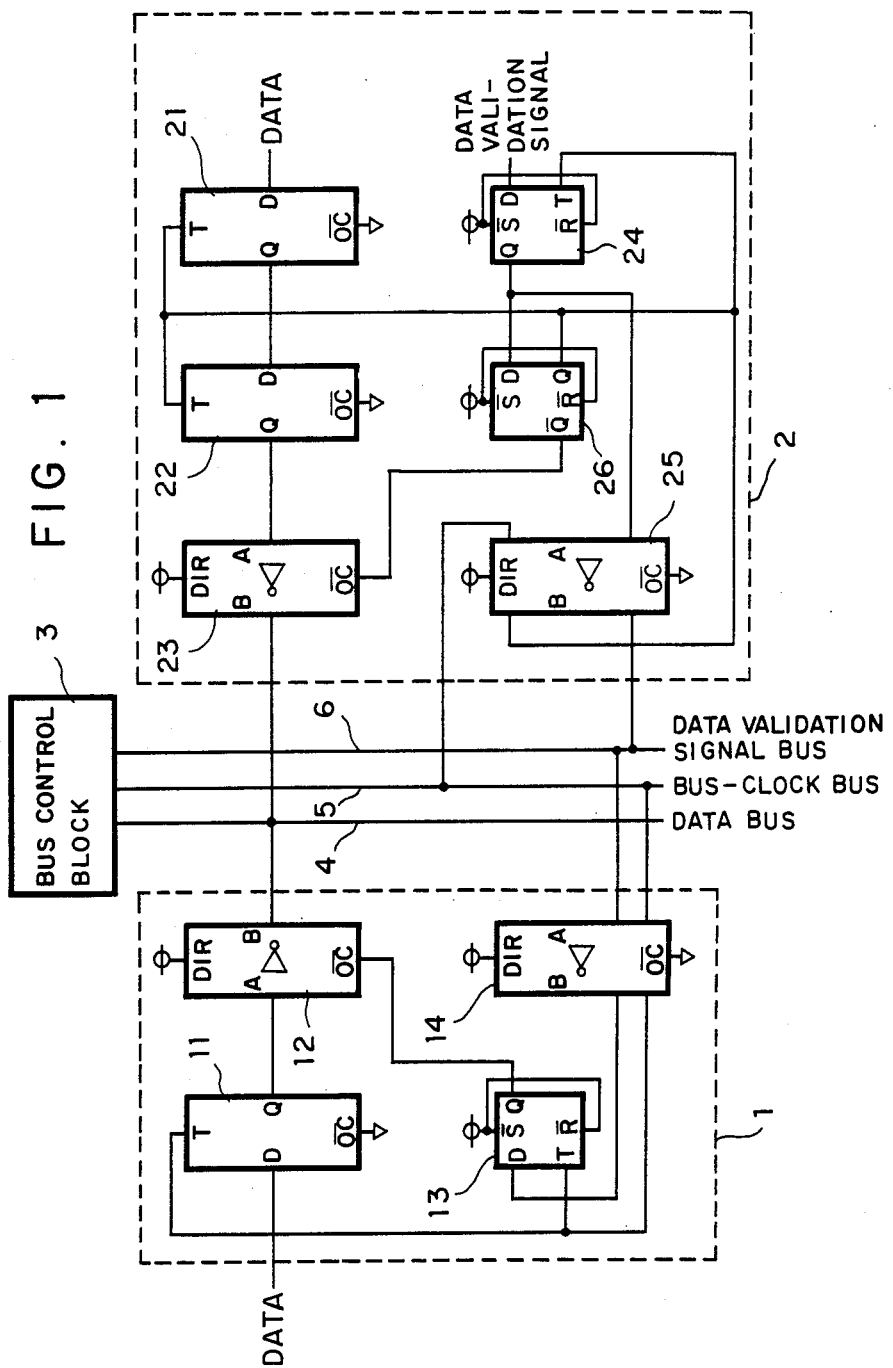
FIG. 1 is a block diagram indicating a data transmission apparatus according to the invention.

Referring to FIG. 1, the indicated example of a data transmission apparatus includes two data generating blocks 1 and 2 which are different in structure and functioning with each other. The two blocks 1 and 2 are connected to three buses coming from a bus control block 3. Out of the three buses, a first is for data transmission, second is for transmitting a bus clock, and third is for transmitting a data validating signal and these are denoted by reference numerals 4, 5, and 6, respectively.

The data generating block 1 is provided with a data latch 11 for latching its data to be transmitted and a buffer circuit 12 for delivering the output of the data latch 11 to the data bus 4. A latch circuit denoted by reference numeral 13 generates at its Q-output terminal a signal for disabling the buffer circuit 12 while the data validating signal on the bus 6 is input to its D-input through a buffer circuit 14. The timing of the operations of the latch circuits 11 and 13 are controlled by a bus clock sent from the bus control block 3 through the bus 5.

The other data generating block 2 is provided with two data latches 21 and 22 for latching its data to be transmitted and a buffer 23 for delivering the data latched in the data latch 22 to the bus 4. The data validating signal generated by proper signal generating means (not shown) when the data to be transmitted is valid is latched by a latch 24 and its Q-output is delivered through a buffer circuit 25 to the bus 6. At the same time, an output of the latch 24 is latched by a latch 26, and a $\overline{Q}$-output of the latch 26 enables the buffer 23. At this state, the data latched by the data latch 22 is delivered to the data bus 4 through the buffer 23, while the data validating signal delivered to the bus 6 is used to disable the buffer 12 at the data generating block 1.

Thus, the data bus 4 is occupied by the data generating block 2. When the data validating signal to the latch 24 disappears, the buffer 23 is disabled and, on the other hand, the buffer circuit 12 is enabled, and at this state, the data latched by the latch 11 becomes able to be delivered to the bus 4 through the buffer 12. The bus clock on the bus 5 taken in through the buffer 25 is used for synchronization of the latches 21, 22, 24, and 26.

Figure 2:
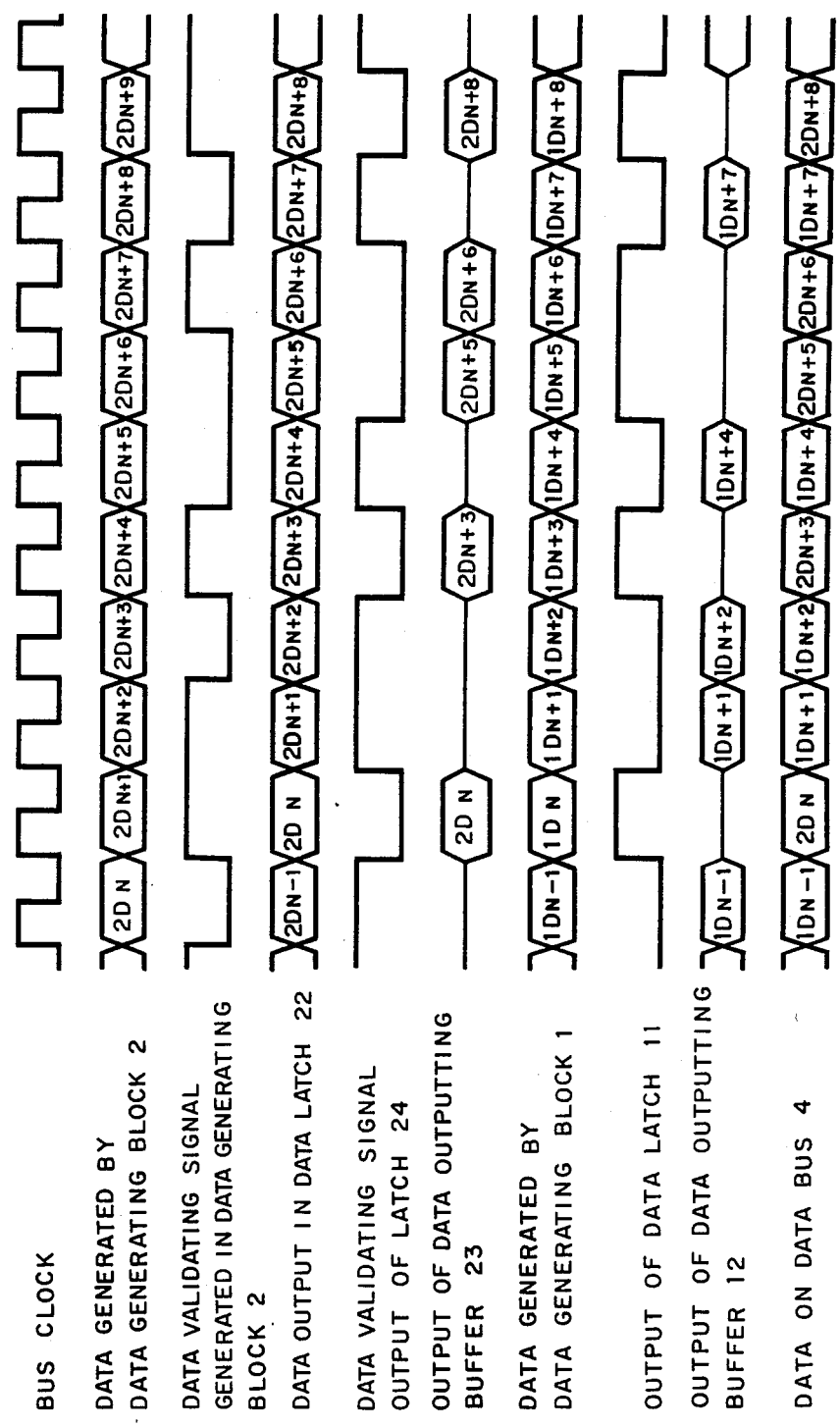
FIG. 2 is a timing chart for signals at various points shown in FIG. 1.
Figure 3:
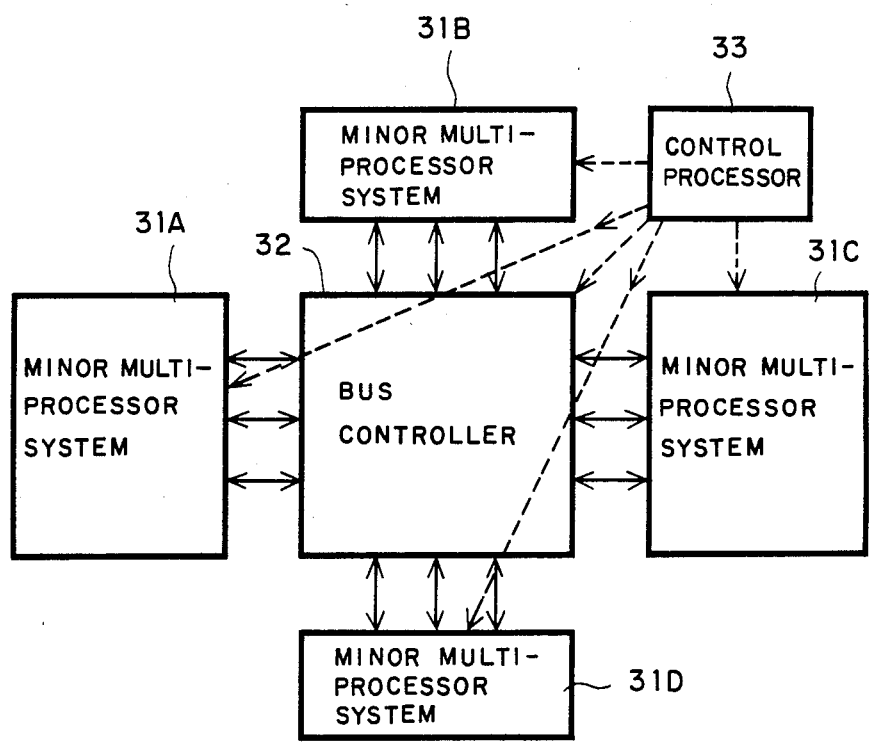
FIG. 3 is a block diagram indicating a prior art data transmission apparatus.

In FIG. 2 is shown timing among the bus clock, the data generated by the data generating block 2, the data validating signal generated in the data generating block 2, the data output in the data latch 22, the data validating signal output of the latch 24, the output of the data outputting buffer 23, the data generated by the data generating block 1, the output of the data latch 11, the output of the data outputting buffer 12, and the data on the data bus 4.

As apparent from FIG. 2, the data to be delivered to the data bus 4 are selected out of the data generated by both of the data generating blocks according to the pattern of the data validating signal. That is, the data transmitted through the data bus 4 have a format in which two kinds of data generated by the two data generating blocks in their own manners are combined in a predetermined pattern. The data in such a format are advantageous when two kinds of data are to be simultaneously displayed on a CRT screen.

Although the example of the invention as indicated in the above mentioned drawing has, for the sake of simplicity of explanation, been described as such that has only a pair of data generating apparatuses 1 and 2, it is possible to provide a plurality of data generating blocks having the same structure as that denoted by 2 in FIG. 1, in which case the data validating signal generated by each of the data generating blocks is supplied to the bus control block through a different bus of each block. The bus control block, when supplied with the data validating signals from more than two data generating blocks simultaneously, permits outputting of the data validating signal only to the data generating block having highest priority in accordance with a predetermined order of priority. The thus output data validating signal is used to inhibit all the other data generating blocks having lower priority from outputting their data and data validating signals. Such control by priority can be easily carried out through the well known art in this field.

What is claimed is:

1. A data transmission apparatus comprising:
    bus means including a data bus, a bus-clock bus, and a data-validating signal bus;
    a bus control block connected to said bus means and including means for delivering a bus clock to said bus-clock bus;
    a first data generating block connected to said bus means and synchronized by said bus clock;
    said first data generating block including a first data latch for latching continuously generated data to be optionally transmitted to said data bus, first validating signal latch means for latching a data validating signal indicating the data to be valid, and first output means which, when the data validating signal is latched by said first validating signal latch means, outputs the data validating signal to the data validating signal bus and outputs the data latched by said first data latch to said data bus; and
    a second data generating block connected to said bus means and synchronized by said bus clock;
    said second data generating block including a second data latch for latching continuously generated data to be optionally transmitted to said data bus, second validating signal latch means for latching the data validating signal input from said data validating signal bus, and second output means which, only when said second validating signal latch means is not latching the data validating signal, is allowed to deliver the data latched by said second data latch to said data bus whereby a composite data signal is produced from selected portions of the continuously generated data signals from said first and second data generating blocks.

2. A data transmission apparatus according to claim 1, wherein said first validating signal latch means in said first data generating block consists of a first validation latch for latching the data validating signal generated in said first data generating block and a second validation latch for latching an output of said first validation latch, the output of said first validation latch being delivered to said data validating signal bus and an output of said second validating being used for enabling said first output means.

3. A data transmission apparatus according to claim 2, wherein timing of operations of said first and second validation latches is controlled by the bus clock from said bus control block.

4. A data transmission apparatus according to claim 2, wherein said first output means in said first data generating block includes a buffer circuit having (1) an input terminal connected with an output terminal of said first data latch, (2) an output terminal connected with said data bus, and (3) a control input terminal being connected with an output terminal of said second validating latch.

* * * * *